Patented May 18, 1954

2,678,942

UNITED STATES PATENT OFFICE 2,678,942

PRODUCTION OF CYANO-AROMATIC CARBOXYLIC ACIDS

Louis L. Ferstandig, El Cerrito, Calif., assignor to California Research Corporation, San Francisco, Calif., a corporation of Delaware No Drawing. Application January 2, 1953, Serial No. 329,472

4 Claims. (Cl. 260—465)

This invention relates to the production of cyano-aromatic carboxylic acids and, more particularly, to the production of cyanobenzoic acids from benzene dicarboxylic acids and ammonia.

The cyanobenzoic acids which are prepared according to the process of the present invention are superior intermediates for the preparation of synthetic fiber-forming linear polymers, pharmaceuticals and resins.

Organic carboxylic acids may be reacted with ammonia to give the corresponding nitriles. It is generally thought that an ammonium salt of the carboxyl group is formed initially and then dehydrated to give first the amide, and finally the nitrile. In the case of organic dicarboxylic acids, both carboxyl groups would be expected to react with ammonia to form the dinitrile as the major product.

It has now been found that contrary to such expectations isophthalic acid may be converted to metacyanobenzoic acids while concurrently suppressing the formation of isophthalo-nitrile by contacting the isophthalic acid with ammonia at temperatures above about 340° C.

Although it is possible to convert any of the isomers of benzene dicarboxylic acid, the meta-isomer, isophthalic acid, is preferred. Ammonium salts of the benzene dicarboxylic acids in either dry form of aqueous solution have also been found to be quite satisfactory as starting materials.

The temperatures in the process may vary over a range having as its lower limit a temperature of about 340° C. and as its upper limit the temperature at which the aromatic dicarboxylic acid commences to decompose. For present purposes temperatures in the range from about 340° C. to about 360° C., and, more particularly, in the range from about 340° C. to about 350° C., are preferred.

The proportions of aromatic dicarboxylic acid and ammonia may be varied widely. Generally speaking, the ammonia in the reaction is employed in excess of the stoichiometrical proportions necessary to give the cyanobenzoic acid. However, less than stoichiometrical amounts of ammonia may be used with little effect on the ultimate yield merely by recycling the unreacted aromatic dicarboxylic acids. For the present it is preferred to provide an excess of ammonia to the reaction in the form of a constant stream, the excess unreacted portion of ammonia being recovered with the reaction products and separated for reuse as desired.

The process may be carried out at atmospheric, subatmospheric or superatmospheric pressures. Atmospheric pressure is presently preferred, since it avoids the use of expensive pressure equipment or vacuum producing apparatus.

The process of the invention may be carried out as either a batch or a continuous process. In either process the reaction is the same. The aromatic dicarboxylic acid is maintained at the desired temperature in contact with ammonia in a reaction zone and the reaction products are withdrawn in vapor phase and separated by conventional means. In a batch type of process, for example, solid aromatic dicarboxylic acid may be conveniently heated to the desired temperature in a vessel suitable for distilling solids, and a continuous stream of ammonia passed through the vessel. The distilled reaction products in the stream of excess ammonia are then recovered by suitable means. In the continuous type of process the solid aromatic dicarboxylic acid may be introduced continuously as, for example, in continuous conveyors or in the form of a fluidized solid feed in a stream of ammonia. The reaction products and unreacted ammonia are continuously withdrawn and sent to a separation process in which the cyanobenzoic acids are recovered by suitable means and the unconverted materials are separated and recycled to the process.

The following specific example is submitted in further illustration of the invention.

*Example 1*

166 g. of isophthalic acid (1 mole) were heated in a stream of ammonia in a flask equipped with a head for the distillation of solids. The pot temperature was raised to 350° C. before the ammonia was passed in. Water distilled off immediately and the overhead temperature rose to 315° C. 123 g. distilled in the range of 315 to to 345° C. in a 4-hour period. Analysis of the distillate showed 63.3 g. of meta-cyanobenzoic acid and 55.9 g. of isophthalic acid. No isophthalonitrile was formed. The yield of meta-cyanobenzoic acid based on isophthalic acid consumed was 85.0 mole per cent.

For the purpose of comparison, the following additional example is offered showing the reaction of benzene dicarboxylic acid and ammonia under ordinary conditions.

*Example 2*

166 g. of isophthalic acid (1 mole) were heated in a stream of ammonia in a flask, as described in Example 1. The reaction temperature was maintained at 310° C. throughout the reaction. During an 8-hour period, the overhead vapor temperature remained between 280° C. and 288° C. Finally, the overhead temperature reached 324° C. as all of the distillable material was removed from the pot. The distillate, a solid white material, weighed 107 g. Upon analysis it was found to contain 47.7 g. of isophthalonitrile and 18.8 g. of meta cyanobenzoic acid. On the basis of isophthalic acid consumed, this amounted to a yield of 74.5 mole per cent isophthalonitrile and 25.5 mole per cent metacyanobenzoic acid.

On the basis of the foregoing examples, the advantages of the present process for producing cyanobenzoic acids are readily apparent. The yield of meta-cyanobenzoic acid obtained in the process according to this invention, as shown by Example 1, was 85.0 mole per cent. In comparison, a yield of only 25.5 mole per cent was obtained when ordinary conditions involving reaction temperatures below 340° C. were employed as in Example 2. Furthermore, none of the benzene dicarboxylic acid is consumed in the production of the dinitrile in the present process. In the reaction, by way of contrast under ordinary conditions, a substantial amount of the benzene dicarboxylic acid is consumed to give a 74.5 mole per cent yield of isophthalonitrile.

I claim:
1. A process for converting isophthalic acid to meta-cyanobenzoic acid and concurrently suppressing the formation of isophthalonitrile which comprises contacting isophthalic acid with ammonia at temperatures above about 340° C.

2. A process for converting isophthalic acid to meta-cyanobenzoic acid and concurrently suppressing the formation of isophthalonitrile which comprises contacting isophthalic acid with ammonia at a temperature between about 340° C. and about 360° C.

3. A process for converting isophthalic acid to meta-cyanobenzoic acid and concurrently suppressing the formation of isophthalonitrile which comprises contacting isophthalic acid with ammonia at a temperature between about 340° C. and about 350° C.

4. A process for converting isophthalic acid to meta-cyanobenzoic acid and concurrently suppressing the formation of isophthalonitrile which comprises heating isophthalic acid in a vessel equipped for distilling solids at a temperature between about 340° C. and about 350° C. in a continuous stream of ammonia and separating meta-cyanobenzoic acid from the distillate.

No references cited.